Patented Mar. 18, 1941

2,235,613

UNITED STATES PATENT OFFICE 2,235,613

BREWER'S YEAST FOOD PRODUCT AND PROCESS FOR MAKING THE SAME

William P. M. Grelck, Baltimore, Md.

No Drawing. Application September 20, 1938, Serial No. 230,814

2 Claims. (Cl. 99—2)

This invention relates to a wet food product of semisolid consistency, containing fresh brewers' yeast as an important ingredient together with solids of milk or lactofermented grain mash including a self preserving quantity of lactic acid produced in a fluid from milk or grain material. The milk material from which the self preserving quantity of lactic acid is obtained, may be skim milk, buttermilk or whey; the grain material from which the self preserving quantity of lactic acid is obtained, may be mash obtained from starchy grains, crushing said grains, gelatinizing or making its starch content soluble in the presence of water by heat, converting the soluble starch with the addition of diastatic malt into malt sugar, converting part of the malt sugar by lactofermentation into lactic acid. Another grain food material from which the self preserving quantity of lactic acid is obtained is distillers' slop, such slop is obtained by removing from distillers' spent grains part or all of the suspended solids by a screening or filtering arrangement; another source for obtaining the required self preserving quantity of lactic acid may be commercial lactic acid.

Fresh brewers' top or bottom yeast contains on an average 75% of moisture. It is the richest source known of water soluble vitamins of the B class consisting of B-1 and the B-2 complex. By drying brewer's yeast practically one half of its vitamin-B content is lost.

An object of my invention is to retain the vitamin-B potency of fresh brewer's yeast by preserving the same in a wet food product of semisolid consistency, containing a self preserving quantity of lactic acid. The total solids in this wet food product of semi-solid consistency may vary from 30% to 50% total solids, according to the nature of the milk or grain material used for obtaining the self preserving quantity of lactic acid.

Another object of my invention is to preserve fresh brewer's yeast by a process to convert the same into a stable and palatable food for animals with fresh brewer's yeast as a principal ingredient.

Another object of this invention is to produce a food material in a wet semi-solid form which contains fresh brewer's yeast and the constituents of soured skim milk, buttermilk, whey or the constituents from a lactofermented grain mash or from distillers' slop containing quantities of lactic acid as required to make the finished product self preserving.

Another object of this invention is to produce a wet food product of semi-solid consistency containing fresh pasteurized brewer's yeast of high biological value, especially rich in vitamin B-2 or the G complex.

Other objects of this invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

Fresh top, or bottom, brewers' yeast is pasteurized by heating the same to a temperature of 150 degrs. F., then intermingled in such quantities with the previously prepared lactofermented milk or grain material so as to make up practically one half of the total solids in the finished product. The second step consists in adding to the proper quantities of lactofermented milk or grain material a quantity of fresh brewer's yeast, then intermingling the same. The third step consists in heating the mixture while being agitated, to from 140 degrs. F. to 155 degrs. F., then drawing the same into a vacuum evaporator and evaporate the surplus moisture in vacuo in such quantities so that the finished product is of semisolid consistency and contains from 30% to 50% total solids, according to the nature of the milk or grain materials used, including not less than 3% lactic acid. The concentration in vacuo assures the preservation of that part of the vitamin-B complex which is sensitive to heat, and thus produces a finished product of high potency of the vitamin-B complex. The fourth step consists in packing the finished product into airtight containers, to be used as a supplementary feed of high biological value in animal nutrition.

In practicing my invention, I prefer to proceed as follows:

*Example 1.*—As the first step, 60 lbs. of skimmed milk is pasteurized or heated while being agitated, to the boiling point to coagulate its albumen, then 40 lbs. of water is added to the milk so as to bring the total solids of the diluted skimmed milk to 6%, then cooling the diluted skimmed milk to lactofermenting temperature, then inoculating the same with a suitable lactoferment and let it stand at suitable fermenting temperature until not less than 1% of lactic acid is produced. The second step consists in drawing the 100 lbs. of fermented skim milk material into a forewarmer fitted with stirring arrangement and heat the same, while being agitated, to 150 degrs. F., then adding 25 lbs. of fresh brewer's yeast. The third step consists in drawing the treated milk and yeast mixture into a vacuum evaporator and remove 90 lbs. to 100 lbs. of water by evaporation in vacuo. The finished product is then drawn off from the evaporator, is of semi-solid consistency and contains from 35% to 50% solids, including a self preserving quantity of lactic acid, and is then packed in airtight containers to be sold as a food.

*Example 2.*—As the first step, 60 lbs. of fresh normal buttermilk is being heated, while agitated, to the boiling point to coagulate its albumen, then 40 lbs. of water is added to the same, so as to bring the total solids of the diluted buttermilk to 6%, then cooling the same to lacto fermenting temperature, then inoculate the same with a suitable lactoferment and let it stand at suitable fermenting temperature until not less than 1% of lactic acid is produced. The heating of the buttermilk may be eliminated, water may be added directly to the fresh buttermilk to dilute the same. The second step consists in drawing the 100 lbs. of lactofermented buttermilk material into a forewarmer fitted with stirring arrangement and heat the same, while being agitated, to 150 degrs. F., then adding 25 lbs. of fresh brewer's yeast. The third step consists in drawing the heated buttermilk and yeast mixture into a vacuum evaporator and remove from 90 to 100 lbs. of moisture by evaporation in vacuo. The finished product, then drawn off from the evaporator, is of semi-solid consistency and contains from 35% to 50% solids, including a self preserving quantity of lactic acid, and is then packed in airtight containers, to be sold as a food.

*Example 3.*—As the first step, 100 lbs. of whey are pasteurized by heating the same to a temperature of 150 degrs. F., then cooling the same to lactofermenting temperature, then inoculating the same with a suitable lactoferment and let it stand at suitable fermenting temperature until not less than 1% of lactic acid is produced. The second step consists in drawing the 100 lbs. of lacto fermented whey into a forewarmer fitted with stirring arrangement and heat the same to 150 degrs. F., then adding 25 lbs. to 30 lbs. of fresh pasteurized brewer's yeast, according to the total solids in the whey. The third step consists in drawing the heated whey and yeast material into a vacuum evaporator and remove from 95 lbs. to 105 lbs. of water by evaporation in vacuo. The finished product, then drawn off from the evaporator, is of semi-solid consistency and contains from 40% to 50% solids, including a self preserving quantity of lactic acid, and is then packed in air-tight containers, to be sold as a food.

Since certain changes in carrying out the above process, and certain modifications in the product which embody the invention may be made without departing of its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of producing a self preserving wet food product of semi-solid consistency from lactofermented non-fatty milk material and from fresh bottom or top brewer's yeast or a mixture of the same, containing a self preserving quantity of lactic acid which comprises the lactofermentation of a fat-free milk material containing approximately 6% total solids, so that not less than 1% of lactic acid is obtained by conversion of part of its sugar of milk content, then pasteurized fresh bottom or top brewer's yeast or a mixture of the same, is added to the lactofermented milk material in such quantity so as to increase the total solids of the fermented milk yeast material to 12%, then drawing the mixture into a vacuum evaporating apparatus for removing the surplus moisture, which is so timed that the finished product contains approximately 36% total solids, including a self preserving quantity of lactic acid.

2. A self preserving wet food product of semi-solid consistency, containing as its principal ingredients approximately one half of its total solids the non-fatty solids of lactofermented milk material and one half of its total solids the solids of fresh pasteurized brewer's yeast, including a self preserving quantity of lactic acid.

WILLIAM P. M. GRELCK.